（12）United States Patent
Jeong et al.

(10) Patent No.: US 8,129,896 B2
(45) Date of Patent: Mar. 6, 2012

(54) FLUORESCENT PARTICLE AND INORGANIC ELECTROLUMINESCENCE DEVICE INCLUDING THE SAME

(75) Inventors: Tae-won Jeong, Yongin-si (KR);
Shang-hyeun Park, Yongin-si (KR);
Min-jong Bae, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 160 days.

(21) Appl. No.: 12/617,292

(22) Filed: Nov. 12, 2009

(65) Prior Publication Data

US 2010/0176714 A1 Jul. 15, 2010

(30) Foreign Application Priority Data

Jan. 13, 2009 (KR) .................. 10-2009-0002721

(51) Int. Cl.
*H05B 33/00* (2006.01)
(52) U.S. Cl. .............................. 313/503; 445/23
(58) Field of Classification Search .......... 313/498–503; 445/23–25
See application file for complete search history.

(56) References Cited

U.S. PATENT DOCUMENTS

| 6,741,019 B1 * | 5/2004 | Filas et al. ............ 313/355 |
| 7,638,938 B2 * | 12/2009 | Aoyama et al. ......... 313/503 |
| 2008/0038532 A1 | 2/2008 | Yi et al. |

FOREIGN PATENT DOCUMENTS

| JP | 05-152073 | | 6/1993 |
| KR | 10-2004-0042606 | | 5/2004 |
| KR | 10-2004-0065667 | | 7/2004 |
| KR | 10-2005-0028261 | | 3/2005 |
| KR | 2006066847 A | * | 6/2006 |
| KR | 10-2007-0092135 | | 9/2007 |

* cited by examiner

*Primary Examiner* — Joseph L Williams
(74) *Attorney, Agent, or Firm* — Cantor Colburn LLP

(57) ABSTRACT

An inorganic electroluminescence device includes a first electrode, a dielectric layer disposed on the first electrode, an inorganic light emitting layer disposed on the dielectric layer, and a second electrode disposed on the inorganic light emitting layer. The inorganic light emitting layer includes a fluorescent particle. The fluorescent particle includes a ZnS mother body and a nano-wire disposed on a surface of the ZnS mother body.

11 Claims, 3 Drawing Sheets

FLUORESCENT PARTICLE AND INORGANIC ELECTROLUMINESCENCE DEVICE INCLUDING THE SAME

CROSS-REFERENCE TO RELATED APPLICATION

This application claims priority to Korean Patent Application No. 10-2009-0002721, filed on Jan. 13, 2009, and all the benefits accruing therefrom under 35 U.S.C. §119, the content of which in its entirety is herein incorporated by reference.

BACKGROUND

1) Field

The following description relates to a fluorescent particle and an inorganic electroluminescence device including the fluorescent particle.

2) Description of the Related Art

Electroluminescence ("EL") devices are commonly used as plane light sources which emit light evenly from an entire surface of a plane thereof, or active light emitting display devices using a phenomenon of changing electric energy to light energy. EL devices may generally be classified as either organic EL devices or inorganic EL devices, according to a type of material of a light emitting layer in a particular El device. Powder-type inorganic EL devices are widely used as light sources of keypads in mobile phones, sign boards or medical equipment, for example.

SUMMARY

Exemplary embodiments include a fluorescent particle providing substantially improved light emitting efficiency.

Exemplary embodiments also include an inorganic electroluminescence ("EL") device, which has a substantially improved light emitting efficiency and/or a substantially reduced a driving voltage.

Exemplary embodiments further include a method of manufacturing a fluorescent particle.

In an exemplary embodiment, a fluorescent particle includes a zinc sulfide (ZnS) mother body, and a nano-wire disposed on a surface of the ZnS mother body.

The nano-wire may be formed of copper(II) oxide, e.g., cupric oxide (CuO).

The fluorescent particle may have a diameter from about 20 micrometers (μm) to about 30 μm.

The ZnS mother body may include a needle formed of copper sulfide (CuS).

In an alternative exemplary embodiment, an inorganic electroluminescence device includes a first electrode, a dielectric layer disposed on the first electrode, an inorganic light emitting layer disposed on the dielectric layer and including a fluorescent particle, and a second electrode disposed on the inorganic light emitting layer. The fluorescent particle may include a ZnS mother body and a nano-wire disposed on a surface of the ZnS mother body.

The nano-wire may include CuO.

The fluorescent particle may have a diameter from about 20 μm to about 30 μm.

The ZnS mother body may include a CuS needle.

The second electrode may be a transparent electrode.

In another alternative exemplary embodiment, a method of manufacturing a fluorescent particle includes forming a ZnS mother body and forming nano-wires on a surface of the ZnS mother body.

The method may further include forming CuS needles in the ZnS mother body.

The nano-wires may be formed by: forming a mixture of the nano-wires and a material of the ZnS mother body; and coating the mixture onto the surface of the ZnS mother body.

The nano-wires may be CuO nano-wires, and the CuO nano-wires may be formed by: forming a copper thin film on the surface of the ZnS mother body; thermally oxidizing the copper thin film to form a copper oxide; and growing the copper oxide.

BRIEF DESCRIPTION OF THE DRAWINGS

The above and other aspects, advantages and features of this disclosure will become more readily apparent and more readily appreciated by describing in further detail exemplary embodiments thereof, taken in conjunction with the accompanying drawings, in which.

DETAILED DESCRIPTION

Figure 1:
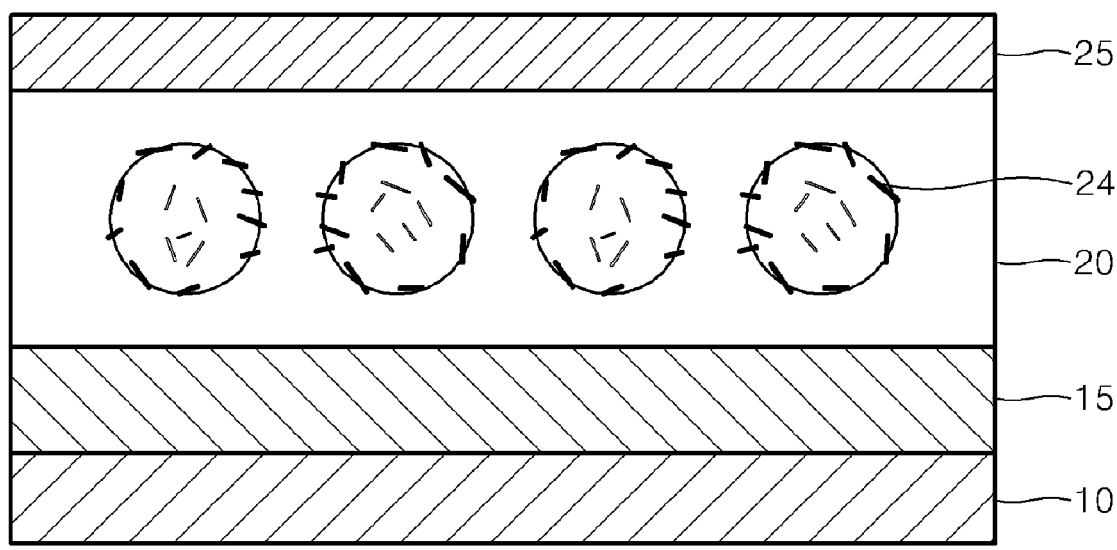
FIG. 1 is a partial cross-sectional view of an exemplary embodiment of an inorganic electroluminescence ("EL") device according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising,"

or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a partial cross-sectional view of an exemplary embodiment of an inorganic electroluminescence ("EL") device. Referring to FIG. 1, the inorganic EL device according to an exemplary embodiment includes a dielectric layer 15 and an inorganic light emitting layer 20. A first electrode 10 is provided below the dielectric layer 15. The inorganic EL device also includes a second electrode 25 disposed on the inorganic light emitting layer 20.

At least one of the first electrode 10 and the second electrode 25 may be formed as a transparent electrode through which light emitted from the inorganic light emitting layer 20 passes. The transparent electrode may be formed of indium tin oxide ("ITO"), however, alternative exemplary embodiments are not limited to ITO. The inorganic EL device illustrated in FIG. 1 is a top-view type inorganic EL device. Since light is emitted upward (as viewed in FIG. 1), the second electrode 25 may be the transparent electrode. The first electrode 10 may be formed of a metallic material such as Ag or a transparent conductive material such as ITO. The dielectric layer 15 may be formed of a silicon oxide material. The first electrode 10, the dielectric layer 15, the inorganic light emitting layer 20 and the second electrode 25 may be formed in a screen-printing method, for example.

Figure 2:
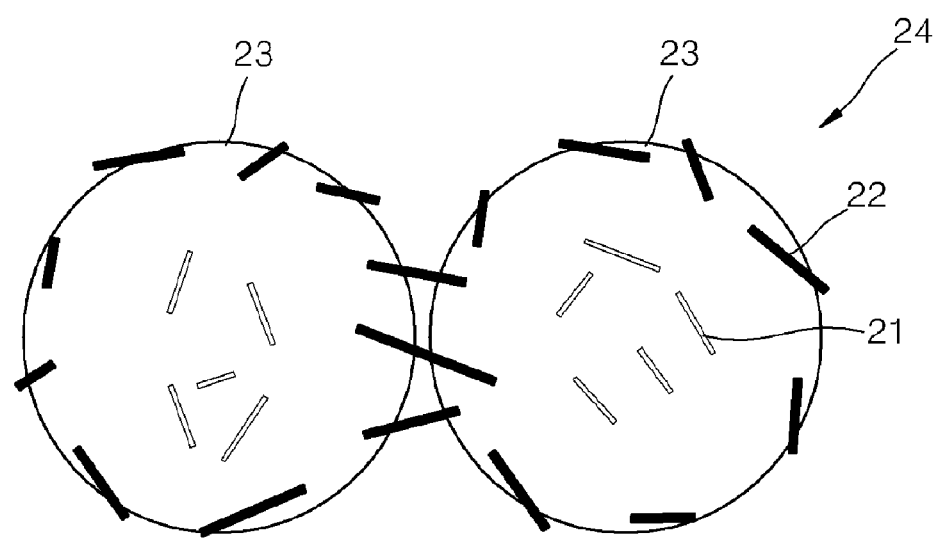
FIG. 2 is a plan view of an exemplary embodiment of a fluorescent particle according to the present invention.

The inorganic light emitting layer 20 may include a plurality of fluorescent particles 24. FIG. 2 shows an enlarged view of an exemplary embodiment of a fluorescent particle 24 of the plurality of fluorescent particles 24, in which needles 21, e.g., CuS needles 21 are included in a mother body 23, which in an exemplary embodiment is a ZnS mother body 23. Nano-wires 22 are disposed on, e.g., are coated or planted on, an outer surface of the ZnS mother body 23. The nano-wires 22 may be mixed with a material of the ZnS-mother body 23 to be dispersed therein and, accordingly, the mixture is easily coated on the ZnS mother body 23 in such a manner that the nano-wires 22 are coated or planted on the surface of the ZnS mother body 23. The fluorescent particle 24 is formed of ZnS:Cu. Cu may be injected into the ZnS mother body 23 as an activator or, alternatively, Cu may be substituted for the Zn so as to form CuS. In the fluorescent particle 24 according to one or more embodiments, an electric field therein is reinforced, since the CuS needle 21 has the needle shape in the ZnS mother body 23 (as shown in FIG. 2). Thus, a florescent particle 24 having a light emitting operation electric field exceeding about $10^6$ volts per centimeter (V/cm) emits light at about $10^5$ V/cm, and efficiently emits light when the florescent particle 24 has a large diameter, e.g., greater than about 20 micrometers (μm), and the needle shape of the CuS needles 21. When the florescent particle 24 has a diameter below about 20 μm, the effect of reinforcing the electric field decreases. On the other hand, when the florescent particle 24 has a diameter exceeding about 30 μm, an overall thickness of a device including the fluorescent particle 24 increases, and an increased voltage is therefore used to emit the light. As a result, an operational voltage of the device increases and a light emitting efficiency thereof may decrease. Thus, in an exemplary embodiment, the fluorescent particle 24 may have a diameter from about 20 μm to about 30 μm, but additional exemplary embodiments are not limited thereto.

When a voltage is applied to the inorganic EL device, an electric field is generated between the first electrode 10 and the second electrode 25, and electrons, which bounce out of the dielectric layer 15 and are accelerated by the electric field, collide with the fluorescent particle 24, and, as a result, the fluorescent particle 24 emits light. The inorganic EL device according to an exemplary embodiment is driven by an alternating current voltage, and the fluorescent particle 24 emits light when the electric field is equal to or greater than a predetermined threshold value, but does not emit light when the electric field is less than the predetermined threshold value. However, in alternative exemplary embodiments, a direct current voltage may be applied between the first electrode 10 and the second electrode 25.

When the electrons that bounce out of the dielectric layer 15 collide with the fluorescent particle 24, electrons in the needles 21 are excited, and light is emitted when an excitation level of the excited electrons is lowered to a base level. In an exemplary embodiment, the nano-wires 22 may be formed of a material having similar electrical properties to electrical properties of the CuS needles 21, such as semiconductor type, energy band gap and work function, for example. In an exemplary embodiment, the nano-wires 22 may be formed of CuO. When the electrons that bounce out of the dielectric layer 15 collide with the fluorescent particle 24 to emit the light, the nano-wires 22 increase a light emitting area and, for a given driving voltage, a light emitting efficiency of the light emitting layer 20 is substantially improved.

The nano-wires 22 may be formed using a low temperature wet growing method, but alternative exemplary embodiments are not limited thereto. In an exemplary embodiment, a copper thin film is formed on the surface of the ZnS mother body and thermally oxidized to form a copper oxide, which is then grown to CuO nano-wires through the low temperature wet growing method. In alternative exemplary embodiments, the nano-wires 22 may be fabricated using method other than described herein. When the electric field is applied to the nano-wires 22, a valid work function is changed and the electrons are discharged out of the nano-wires 22 due to a tunneling phenomenon, which is referred to as a field emission effect. The field emission effect is strengthened at an end of the nano-wire tip. Thus, the light emitting efficiency of the inorganic light emitting layer 20 is further improved due to the field emission effect of the nano-wires 22.

Figure 3:
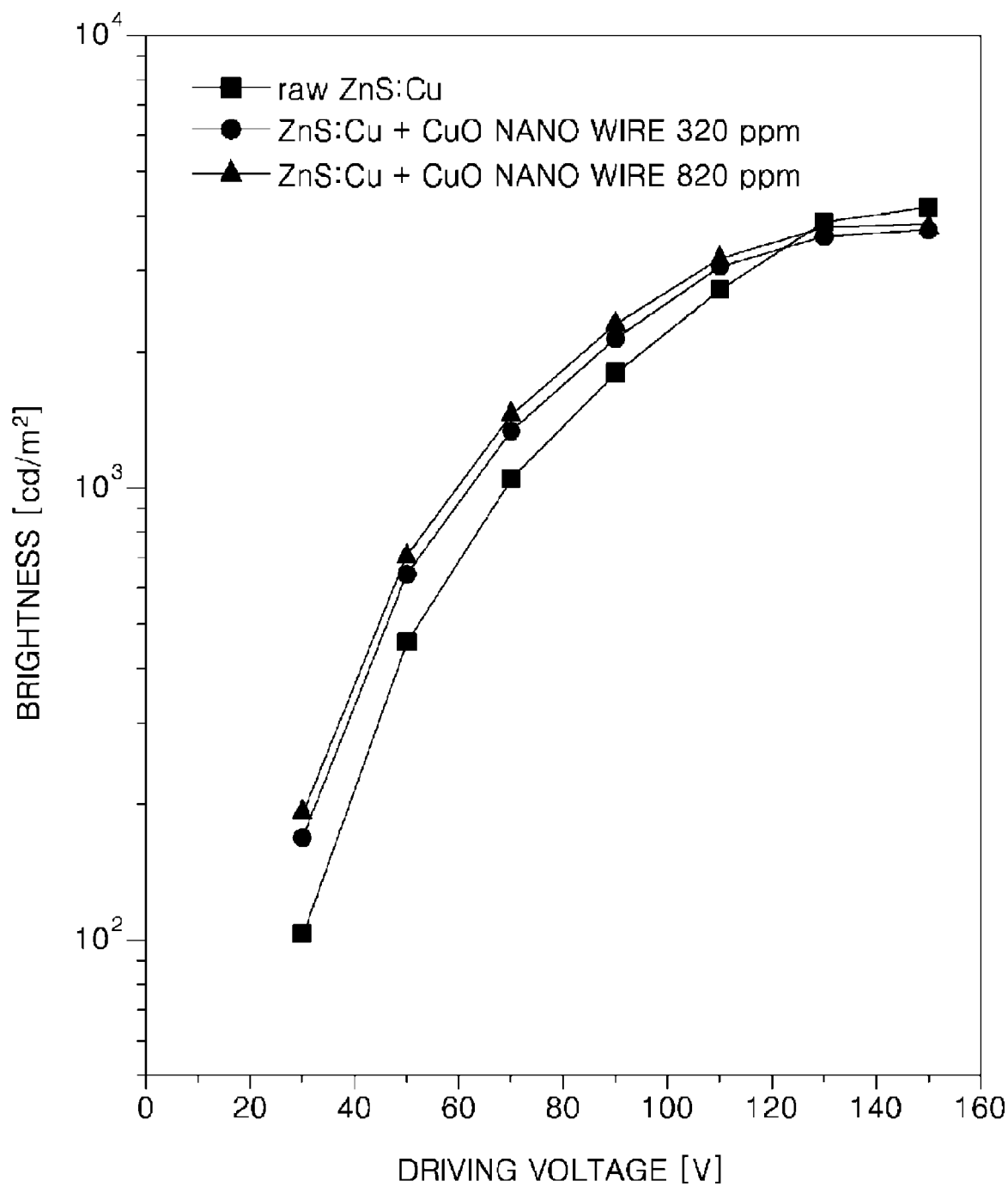
FIG. 3 is a graph of brightness versus driving voltage illustrating brightness and driving voltages characteristics in the inorganic EL device shown in FIG. 1 and an inorganic EL device not including nano-wires.

FIG. 3 is a graph of brightness, in candelas per square meter ($cd/m^2$), versus driving voltage, in volts (V), illustrating brightness as a function of driving voltages in inorganic EL devices according to exemplary embodiments (including the nano-wires 22), and an inorganic EL device not including nano-wires. More specifically, brightness according to driving voltage is shown in FIG. 3, in each of an inorganic EL device according to an exemplary embodiment including 320 parts-per-million (ppm) of CuO nano-wires, an inorganic EL device according to an exemplary embodiment including 820 ppm of CuO nano-wires and an inorganic EL device not including nano-wires. The brightness is measured at a frequency of 20 kilohertz (kHz), and the driving voltage was applied up to 150 V. When the driving voltage is lower than 120 V, the inorganic EL devices including the fluorescent particle coated or planted with the CuO nano-wires show a higher brightness than that of the other inorganic EL devices. The lower the driving voltage is, the greater a brightness difference becomes. Since an inorganic EL device generally operates at a driving voltage from about 60 V to about 100 V, the driving voltage may be reduced to obtain a same brightness by using the fluorescent particle with the CuO nano-wires coated or planted on the surface thereof. For example, when a brightness of 1000 $cd/m^2$ is desired, the driving voltage of the inorganic EL device including the CuO nano-wires may be reduced by about 14 percent (%), as compared with the inorganic EL device which does not include the CuO nano-wires. That is, the driving voltage can be reduced from about 69 V to about 59 V in an exemplary embodiment.

Figure 4:
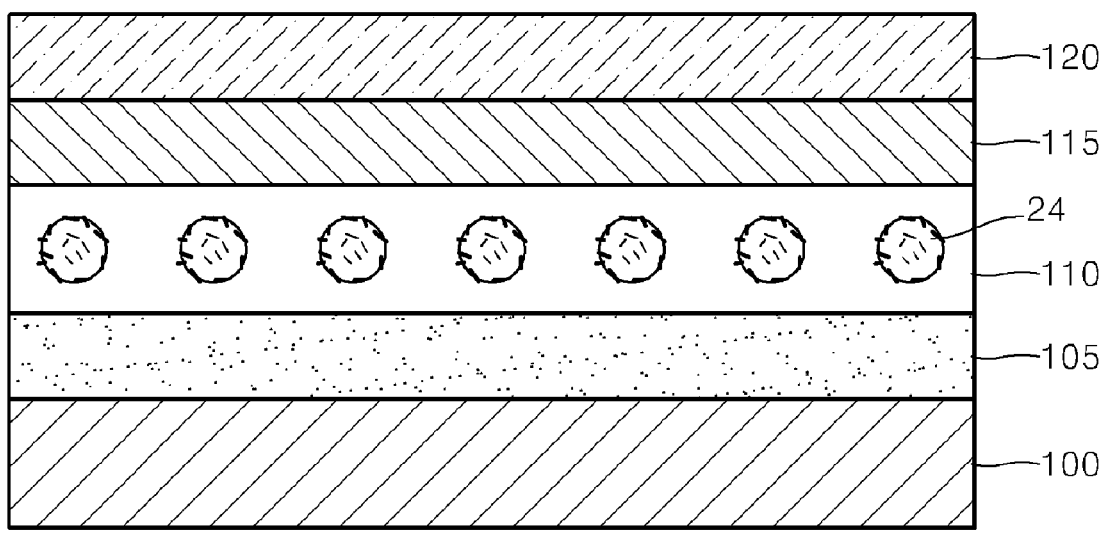
FIG. 4 is a partial cross-sectional view of an alternative exemplary embodiment of an inorganic EL device according to the present invention.

In an alternative exemplary embodiment, the inorganic EL devices including the fluorescent particle coated or planted with the CuO nano-wires may be fabricated as a bottom view type display device, in which light is discharged through a bottom surface thereof, as shown in FIG. 4, which is a partial cross-sectional view of an alternative exemplary embodiment of an inorganic EL device. Referring to FIG. 4, an inorganic EL device according to an alternative exemplary embodiment includes a substrate 100, a first electrode 105 disposed on the substrate 100, an inorganic light emitting layer 110 disposed on the first electrode 105, a dielectric layer 115 disposed on the inorganic light emitting layer 110, and a second electrode 120 disposed on the dielectric layer 115. The substrate 100 may be a transparent substrate which transmits light, such as a glass substrate or a plastic substrate, for example. The first electrode 105 is a transparent electrode, and the second electrode 120 may be a transparent electrode or, alternatively, a metal electrode. The inorganic light emitting layer 110 substantially improves the light emitting efficiency of the inorganic light emitting layer 110 by including the fluorescent particle 24, as described in greater detail above with reference to FIGS. 1 through 3.

It will understood that the exemplary embodiments described herein are to be considered in a descriptive sense only, and not for purposes of limitation. Descriptions of features within each exemplary embodiment are available as the same or similar features in other, or alternative, exemplary embodiments.

Moreover, the present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A fluorescent particle comprising:
a ZnS mother body; and
a nano-wire disposed on a surface of the ZnS mother body, wherein the nano-wire comprises CuO.

2. The fluorescent particle of claim 1, having a diameter from about 20 μm to about 30 μm.

3. The fluorescent particle of claim 1, wherein the ZnS mother body includes a needle comprising CuS.

4. An inorganic electroluminescence device comprising:
a first electrode;
a dielectric layer disposed on the first electrode;
an inorganic light emitting layer disposed on the dielectric layer and including a fluorescent particle disposed therein; and
a second electrode disposed on the inorganic light emitting layer,
wherein the fluorescent particle comprises:
a ZnS mother body; and
a nano-wire disposed on a surface of the ZnS mother body, wherein the nano-wire comprises CuO.

5. The inorganic electroluminescence device of claim 4, wherein the fluorescent particle has a diameter from about 20 μm to about 30 μm.

6. The inorganic electroluminescence device of claim 4, wherein the ZnS mother body includes a needle comprising CuS.

7. The inorganic electroluminescence device of claim 4, wherein the second electrode is a transparent electrode.

8. A method of manufacturing a fluorescent particle, the method comprising:
forming a ZnS mother body; and
forming nano-wires on a surface of the ZnS mother body, wherein the nano-wires comprise CuO.

9. The method of claim 8, further comprising forming a CuS needle in the ZnS mother body.

10. The method of claim 8, wherein the forming the nano-wires comprises:
forming a mixture of the nano-wires and a material of the ZnS mother body; and
coating the mixture onto the surface of the ZnS mother body.

11. The method of claim 8, wherein the forming the nano-wires comprises:
forming a copper thin film on the surface of the ZnS mother body;
thermally oxidizing the copper thin film to form a copper oxide; and
growing the copper oxide.

* * * * *